F. P. SHANNON.
NUT LOCK.
APPLICATION FILED MAR. 3, 1910.
985,764.
Patented Feb. 28, 1911.
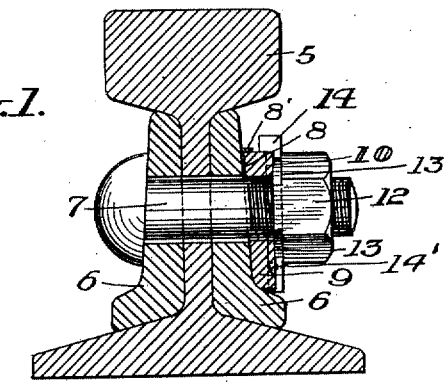
Fig. 1.
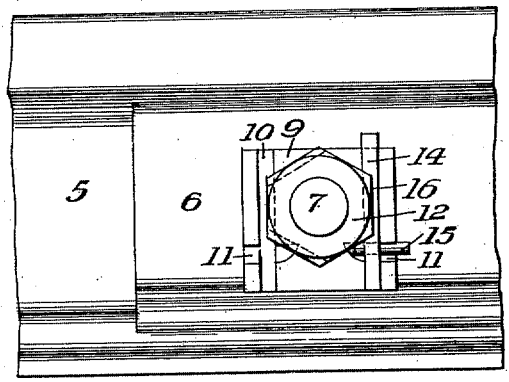
Fig. 2.
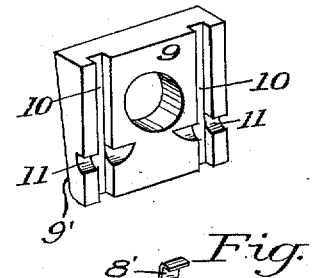
Fig. 3.
Fig. 4.
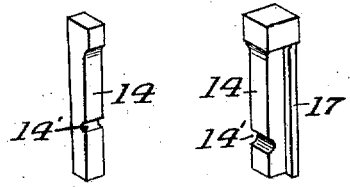
Fig. 5.   Fig. 6.
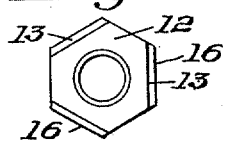
Fig. 7.
Witnesses
Walter Fawaries
T. Bertram Humphries
Inventor
F. Pierce Shannon
By John J. Power
Attorney
THE NORRIS PETERS CO., WASHINGTON, D. C.

UNITED STATES PATENT OFFICE.

FRANK PIERCE SHANNON, OF PITTSBURG, PENNSYLVANIA, ASSIGNOR OF ONE-HALF TO WILLIAM JAMES FREELAND, OF PITTSBURG, PENNSYLVANIA.

NUT-LOCK.

985,764.     Specification of Letters Patent.      Patented Feb. 28, 1911.

Application filed March 3, 1910. Serial No. 547,119.

*To all whom it may concern:*

Be it known that I, FRANK PIERCE SHANNON, a citizen of the United States, resident of Pittsburg, in the county of Allegheny and State of Pennsylvania, have invented a new and useful Improvement in Nut-Locks; and I do hereby declare the following to be a full, clear, and exact description thereof.

My invention relates to an improvement in nut locks.

The object of my invention is to devise a nut-lock that will be effective in preventing a loosening of a nut on a bolt from a position or frictional contact which it may be desired to maintain. And a further object is to make such a device simple as to construction and operation, and economical as to cost.

In the accompanying drawings, Figure 1 is a cross section of rail. Fig. 2 is a side elevation of same. Fig. 3 is a perspective of locking block used in connection therewith. Fig. 4 is a detailed perspective of a bushing. Figs. 5 and 6 detailed perspective of locking pins. Fig. 7 is a face view of a lock nut.

Reference numerals in the following specification refer to like parts in the drawings, in which the rail section 5, (Figs. 1 and 2) is spliced at the end thereof by the fish-plates 6 which have their outer faces preferably inclined, said rail and fish-plates having suitable corresponding openings through which a bolt 7 is inserted, a suitable bushing preferably a thin split ring 8 having an integral projecting part 8' and being carried upon the bolt. A block 9 having an inclined side 9' and a suitable opening therein is fitted over the threaded end of the bolt and preferably over the ring 8 (the inclined side 9' of the block being parallel and in engagement with the outer inclined face of the fish-plate) and against the projecting part 8'. The block 9 is provided with slots 10, which are transversely intersected by the grooves 11. A nut 12 has preferably every other of its hexagon sides contracted along the inner marginal edge as at 13 so that when one of the contracted sides of the nut is turned upon the bolt 7 parallel with either of the slots 10, the contracted side will be substantially flush with the inner side of the slot in which a suitable pin 14 having a key-way 14' is inserted to engage the contracted side 13 and prevent the loosening of the nut while the pin is in the slot. A key 15 is then inserted in the transverse groove 11 and through the key-way 14' to prevent lateral movement of the pin in the slot 10, the pin being confined in the slot by the projecting side 16 of the nut extending over the pin and holding the pin downwardly in the slot.

Fig. 6 shows a modification of the pin wherein the latter is provided with a small flange 17 for the purpose of taking up any material excess of contraction in the part 13 of the nut, in which event this modified form of pin may be desirable.

With my invention constructed as shown and described, the application of my invention is as follows: The block 9 is placed over the bolt 7, and if there is any undue play in the opening in the block, the split ring 8 may be placed upon the bolt to act as a bushing between those parts (Fig. 1). The nut 12 is then turned upon the bolt forcing the block against the integral projecting part 8' by which the ring will be carried in position by the movement of the block which is finally tightened against the fish-plate which frictionally engages the inner face and lower side of the block against rotation. When the nut has been sufficiently tightened against the block with one of its contracted sides parallel with one of the slots, a pin may then be inserted in the slot where it will be retained against the contracted sides of the nut by the projecting side thereof to prevent any loosening of the nut, and the key may then be inserted in the key-way to secure the pin against lateral movement.

It will be apparent that certain changes or modifications may be effected in the parts, that the split-ring and the keying of the pin may be omitted if desired without departing from the spirit of the invention.

What I claim as my invention is:

1. In a nut lock, the combination of a fish-plate, a bolt, a block having oppositely disposed slots, a nut having its sides alternately contracted adjacent to one face of the nut, so that when any plane side of said nut is parallel with one of said slots one of said contracted sides will be parallel with the opposite slot, a pin having a key-way therein and engaging a contracted side of said nut, a slot in the block and transverse to said pin, and a key within the transverse slot and engaging the key-way in the pin to prevent lateral movement of said pin.

2. In a nut lock, the combination of a fish-plate, a bolt, a block having a slot and carried by the bolt, a nut having a side in alinement with the slot, said nut being carried against the block to force the latter against the fish-plate, a pin within said slot and having a key-way therein and engaging said nut, a slot in the block transverse to said pin, and a key within the transverse slot and engaging the key-way in the pin to prevent lateral movement of said pin.

3. In a nut lock, the combination of a fish plate, a bolt, a block having a slot therein and carried by the bolt, a flexible member intervening the fish plate and the block, a nut having contracted sides adjacent to its inner face for alinement with the slot, said nut being carried against the block to force said block toward the flexible member, a pin having a key-way therein and engaging said slot and a contracted side of said nut, a slot in the block transverse to said pin, and a key within the transverse slot and engaging the key-way in the pin to prevent lateral movement of said pin.

In testimony whereof, I the said F. PIERCE SHANNON have hereunto set my hand.

F. PIERCE SHANNON.

Witnesses:
J. L. TREFALLER, Jr.,
WALTER FAMARISS.

---

Copies of this patent may be obtained for five cents each, by addressing the "Commissioner of Patents, Washington, D. C."